Dec. 15, 1964  R. N. LINCOLN ETAL  3,161,403
ANGULAR TUMBLING SCREW BLENDER
Filed April 16, 1962  2 Sheets-Sheet 1

INVENTORS:
ROBERT N. LINCOLN
PERRY R. MADSEN
HERSCHEL W. SUDDEN
BY
Gravely, Lieder & Woodruff
ATTORNEYS.

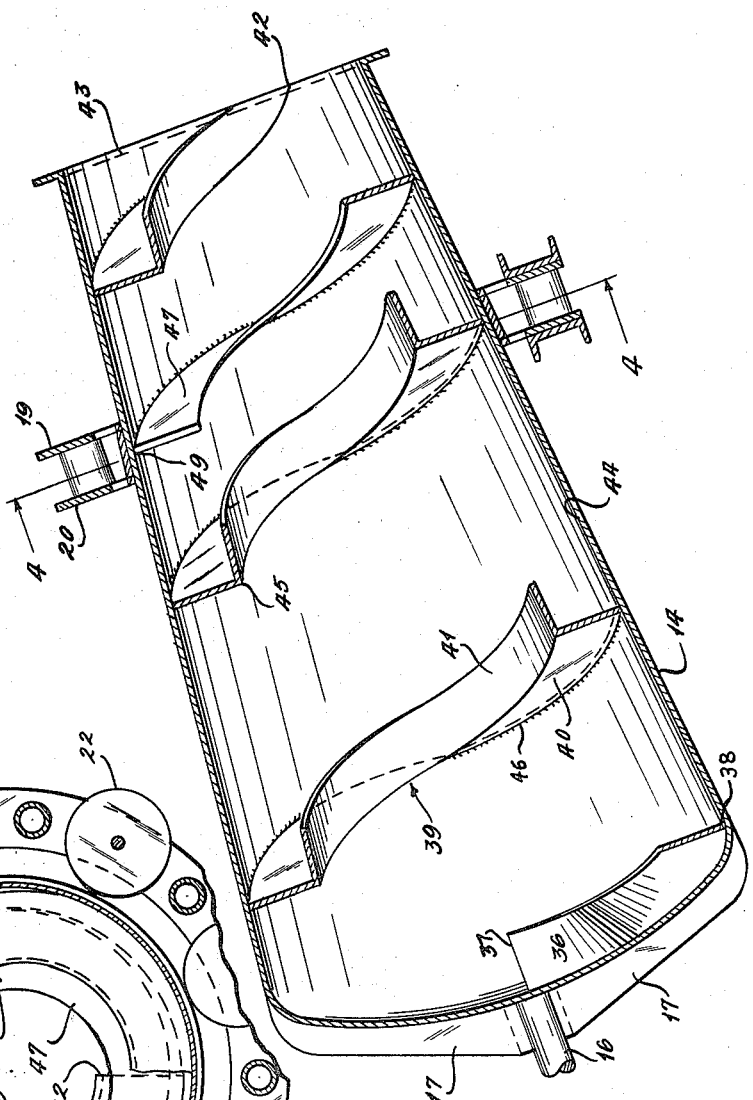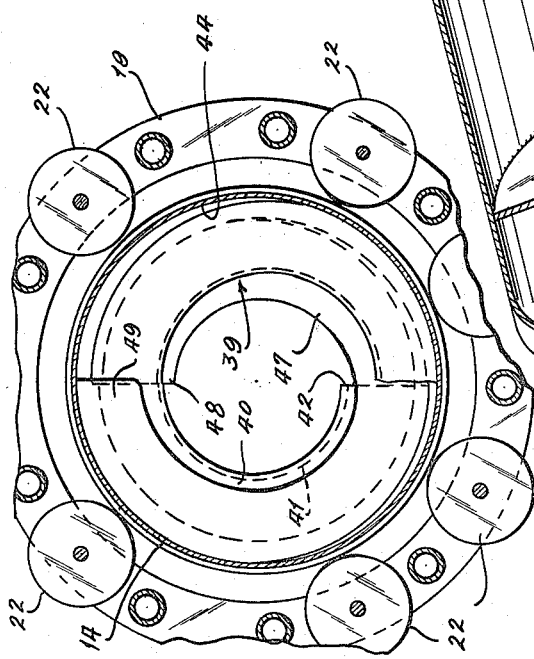

United States Patent Office 3,161,403
Patented Dec. 15, 1964

3,161,403
ANGULAR TUMBLING SCREW BLENDER
Robert N. Lincoln, Florissant, Mo., and Perry R. Madsen, Orland, and Herschel W. Sudden, Fresno, Calif., assignors to Pet Milk Company, St. Louis, Mo., a corporation of Delaware
Filed Apr. 16, 1962, Ser. No. 187,724
3 Claims. (Cl. 259—30)

The present invention relates to an angular tumbling screw type mixing vessel capable of combining dry and wet materials and homogeneously blending a mixture of liquids and solids, and in particular to disperse blended quantities of dry granular and powder type ingredients throughout quantities of solid fruit particles suspended in liquid fruit juices, sugars and syrups without crushing, fragmenting or pulping the fruit particles.

Heretofore, mixing techniques have been limited to variations of three basic methods and apparatus. These methods and devices include circular agitation in a vertical mounted cylindrical vessel using vertically mounted rotating agitator members; ribbon-auger type apparatus having a horizontal reel rotating in a horizontally mounted cylindrical shaped vessel with the reel rotating about a horizontal axis; and mixer type apparatus wherein two stirring arms or paddles move up and down following an elliptical path of motion in a vertical plane as the containing vessel is simultaneously rotated about a pivot or axis in a horizontal plane.

These methods of mixing produce objectional crushing, fragmenting and pulping of fruit slices, pieces and particles or other cellular fibrous solids by virtue of the mixing principle upon which they operate wherein a bar, ribbon blade, propeller or stirring arm is moved about in a prescribed path of travel within the confines of the containing vessel forcing the product in its path to one side or the other. The resulting concentration of force created at the leading edge of the agitating member as it moves through the product acts to squeeze, mash, cut and tear any cellular fibrous solids such as fruit slices, pieces and particles in its path of travel.

Another objection to present mixing methods is failure of the equipment to evenly distribute and incorporate the blend of dry granular and powder type ingredients into the mixture of liquids and solids. This permits quantities of the dry ingredients to become encompassed in a skinlike shell or coating of semi-moist dry ingredients creating lumps or balls of unincorporated dry ingredients throughout the resultant mixture. This is particularly prevalent in blends containing higher percentage ratios of starch type ingredients.

Still another objection to present mixing methods is that there is inadequate provision for blending of the mixture from top to bottom of the containing vessel thereby producing stratification and unlike or non-uniform product throughout the resultant mixture.

The present invention relates to an apparatus for blending and mixing blended quantities of dry granular and powder type gelatinous ingredients throughout quantities of cellular fibrous type solids such as fruit slices, pieces or particles suspended in liquids such as fruit juices, sugars and syrups into a resultant homogeneous product without crushing, fragmenting or pulping the solids portion of the product.

A principal object of the present invention is to provide an apparatus for gently incorporating a blend of the aforementioned ingredients in such manner as to obtain a homogeneous mixture of product without caking or lumping.

Still another object of this present invention is to accomplish a blending of the aforementioned ingredients with sufficient and proper agitation to prevent stratification of the product.

Still another object of this present invention is to provide an apparatus capable of homogeneously mixing and blending the aforementioned types of ingredients within broad ranges of viscosity and temperature encountered in varying formulations and product quality protection requirements.

These and other objects and advantages will become apparent hereinafter.

The present invention comprises a blending apparatus including a vessel adapted to be rotated in clockwise and counterclockwise directions at varying speeds and having a main continuous spiral "L-shaped" flighting positioned on the inner surface thereof and a secondary flighting positioned at the open end of the vessel. The present invention further includes the method of mixing and the apparatus hereinafter described and claimed.

FIG. 3 is a sectional view taken along line 3—3 of FIG. 2, and

FIG. 4 is a sectional view taken along line 4—4 of FIG. 3.

Figure 1:
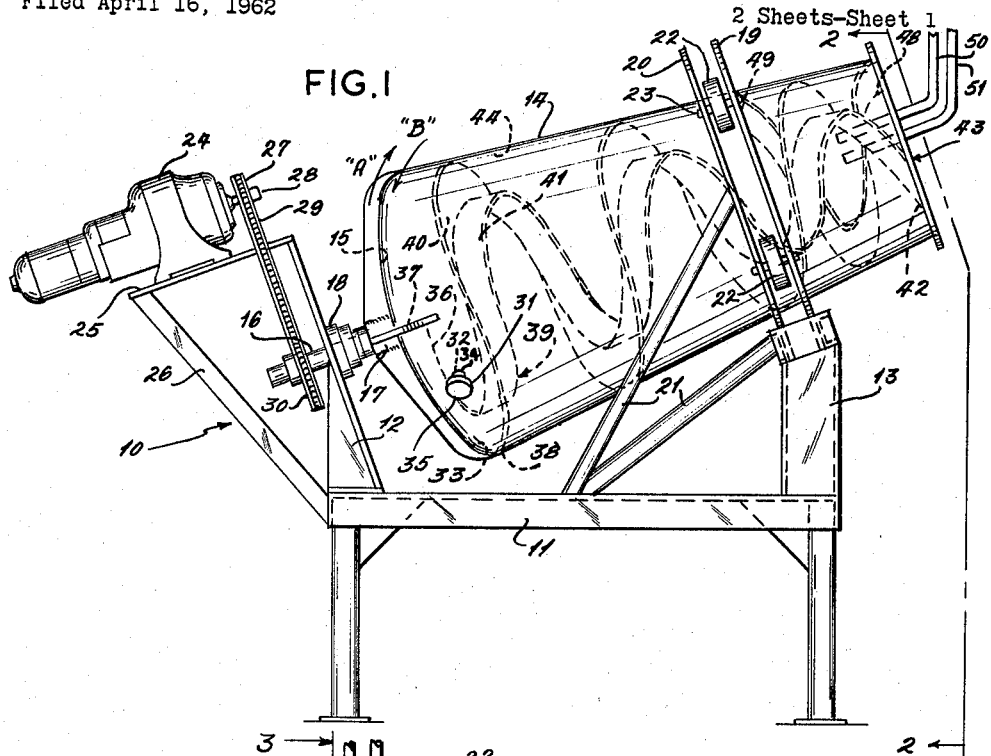
FIG. 1 is a side elevational view showing the flighting in detail.
Figure 2:
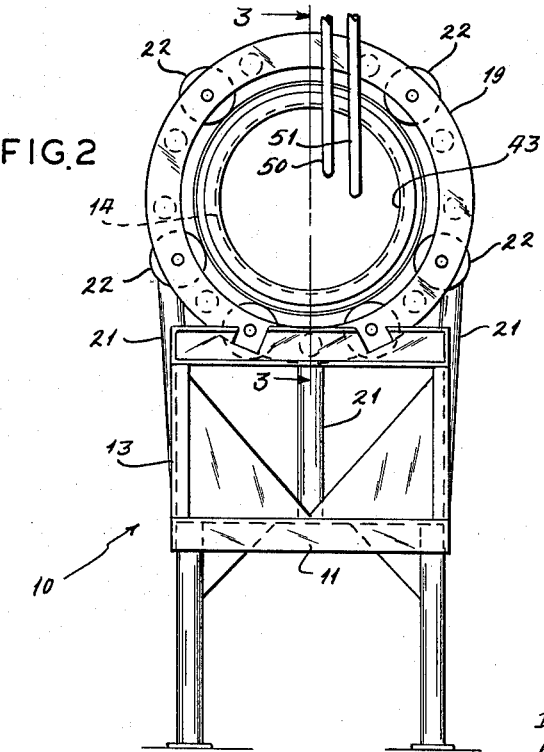
FIG. 2 is an end view taken along line 2—2 of FIG. 1.

Referring to the accompanying drawings wherein like numerals refer to like parts, this invention, an angular tumbling screw blending vessel 10 comprises a structural angle iron machine base 11 which supports a pivotal bearing mounting plate 12 and a throat support mounting bracket 13. A conical shaped mixing chamber vessel 14 with a circular dished bottom 15 is supported and pivoted on a stub shaft 16, welded at the center point of the dished bottom 15. The stub shaft 16 is reinforced by four strengthening gussets 17 which are welded to the shaft 16 and to the dished bottom 15. The shaft 16 extends through a radial thrust bearing 18 which is affixed to the pivotal bearing mounting plate 12.

The upper or throat end of the conical shaped mixing chamber vessel 14 is centrally supported in a pair of throat support rings 19 and 20 which are mounted on the throat support bracket 13 and are laterally reinforced by stabilizing members 21. Support and guidance for the throat end of the conical shaped mixing chamber vessel 14 is transmitted from the throat support rings 19 and 20 to the vessel 14 through throat carrier rolls 22. The carrier rolls 22 are rotatably mounted on stationary pins 23 which are adjustably fixed to the throat support rings 19 and 20.

A gear motor drive unit 24 is mounted on a base 25 and is supported by the pivotal bearing mounting plate 12 and a stabilizing member 26 extending from the machine base 11. The gear motor 24 transmits power of rotation from a roller chain sprocket 27 fixed on a gear motor shaft 28 through a roller chain 29 to a roller chain sprocket 30 fixed on the stub shaft 16.

A ferrule 31 is fitted into an opening 32 located at the mid-point in the knuckle arc 33 of the dished bottom 15 of the vessel 14. The ferrule 31 is fitted with sanitary threads 34 to receive a cap 35 to permit closure of the opening 32. The opening 32 is provided to allow drainage of cleaning solution from the vessel 14. The ferrule 31 extends from the opening 32 parallel to the radius of the conical vessel 14 at 180 degrees angular displacement from a bottom gusset flighting 36.

The internal construction of the conical vessel 14 consists of the flat metal gusset flight 36 positioned in the plane of the center line of the vessel 14 and extending from the center line of the vessel 14 at 37 to the perimeter of the vessel 14 at 38. The gusset flight 36 is held in this position by welding to the dished bottom 15 and to the vessel 14. The gusset flight 36 is joined to an L-shaped counterclockwise wound spiral flighting 39. The flighting 39 consists of an elevating flight segment 40 and a carrier flight segment 41 and extends from the point 38 in a uniformly spaced counterclockwise spiraling path making three 360 degree turns around the inside circumference of the conical shaped mixing chamber vessel 14 to a point 42 at the throat inlet 43. The plane of the elevating flight segment 40 is perpendicular to the center line of the vessel 14. The carrier flight segment 41 has the same spiraling pitch as the elevating flight segment 40 and is formed to maintain the plane of this carrier flight 41 parallel to and uniformly distant from the shell line 44 of vessel 14. The carrier flight segment 41 is supported by welding of the bottom edge of the spiral band to the corresponding inner arc of the spiraling elevating flight segment 40 as at 45. The spiraling elevating flight segment 40 is positioned and supported by welding to the shell line 44 of vessel 14 as at 46.

An auxiliary counterclockwise wound spiral flighting 47 having a spiral pitch identical to that of the elevating flight segment 40 extends one 360 degree spiral turn from a point 48 on the throat inlet 43 to a point 49 along the shell line 44 of the vessel 14 with its plane maintained perpendicular to the center line of the vessel 14. The elevating flight segment 47 is positioned and supported by welding to the shell line 44 of the vessel 14 and is displaced 180 angular degrees from the L-shaped flighting 39. The points 48 and 42 on the throat inlet 43 are displaced 180 angular degrees.

As hereinbefore discussed, the purpose of the present apparatus is to completely mix and blend a given quantity of dry ingredients into a given quantity of wet or moist ingredients without damaging the physical characteristics of the materials incorporated in the product. Further, this apparatus is provided with means for discharging the product mixture from the vessel 14 upon completion of a specified mixing and blending cycle. The following discussion of operating procedures and principles fully describes the operation of the present invention in accomplishing the foregoing purposes.

The apparatus 10 is set in motion by applying a source of electrical energy to the gear motor 24 causing clockwise rotation of the motor shaft 28 and the roller chain sprocket 27 fixed thereto. Power of rotation of the sprocket 27 is transmitted through the roller chain 29 to the roller chain sprocket 30 fixed on the stub shaft 16 causing the stub shaft 16 to rotate in a clockwise direction in the radial thrust bearing 18. Since the stub shaft 16 is rigidly fixed to the dished bottom 15 of the vessel 14, the vessel 14 assumes a clockwise rotation about an axis from the center of the stub shaft 16 centrally located in the radial thrust bearing 18 to the center point of a circle located such that all six carrier roll pins 23 are centered on its circumference. The throat inlet end 43 of the vessel 14 is supported and guided by the throat carrier rolls 22. The rolls 22 are rotatably mounted on the carrier roll pins 23 which are adjustably fixed to the throat support rings 19 and 20 mounted on the throat support bracket 13.

With the vessel 14 rotating in a clockwise direction, a given quantity of liquid and the moist solids portion of the ingredients to be mixed are pumped, poured or dumped by gravity through or into the throat inlet 43. The stationary pipes 50 and 51 show a preferred method of loading ingredients into the vessel 14. The pipe 50 passes the liquid and moist solids well inside the throat inlet 43 and the pipe 51 deposits the dry ingredients (as will be described more fully hereinafter) into the vessel 14 well inside the throat inlet 43. As the vessel 14 rotates clockwise, the force of gravity combined with the progressing spiral pitch of the counterclockwise wound spiral flighting 40 results in a force which acts to move, de-elevate or convey the product away from the inlet 43 toward the dished bottom 15 and into the body of the mixing chamber vessel 14. As the vessel 14 continues to rotate to a clockwise direction, the product between successive spirals of the spiral flighting 40 continues to be moved toward and into the extreme dished bottom 15 area of the vessel 14 with the product accumulation gently reversing direction of flow as it flows over the spiral wound flighting 40 into the unobstructed area within the inside circumference of the carrier flighting 41 toward the throat inlet 43 seeking the gravitational level of the product in the vessel 14.

In addition to and combined with the aforementioned dispersion, is a clockwise rotational force exerted on the product which tends to lift or elevate a portion of the product along the bottom perimeter of the vessel 14 in a clockwise rotational direction and folds back or deposits this portion into or on the uppermost product at the product level in the vessel 14. These combined forces and the resultant product flows assure a gentle, effective and thorough agitation and dispersion of ingredients.

Continuing clockwise rotation of the vessel 14 and having completed the addition of the liquid and moist solids portion of the ingredients, the desired quantities of blended dry granular ingredients are pumped, poured or dumped by gravity through or into throat inlet 43 (by the pipe 51) making provision to deposit the dry ingredients beyond the upper line of the liquid level. The dry ingredients should be deposited at a uniform rate determined by the solid-liquid ratio, product viscosity and rotational speed of vessel 14 until all ingredients have been deposited.

The delicate fruit filling mixture is not damaged even if it is left in the rotating vessel 14 for hours, although a normal mixing cycle, including loading of the ingredients and unloading of the product, usually consumes only about 10–30 minutes. In other blending machines, the fruit pulp is chopped and otherwise damaged during a normal mixing cycle.

Upon completion of the mixing, as determined by product specifications, rotation of the vessel 14 is stopped by disconnecting the source of electrical power to the gear motor 24.

To unload product from the mixing vessel 14, reverse phase power is connected to the gear motor 24 energizing it in a counterclockwise direction of rotation and in turn driving the vessel 14 in a counterclockwise direction of rotation. The counterclockwise wound spiral elevating flight 40 and the carrier flighting 41 also rotate in a counterclockwise direction. This rotation of the elevating flight 40 produces a vector force on the product in its path of rotation which, when combined with gravitational forces of the product, results in a force which acts to move, elevate or convey the product away from the dished bottom 15 of the vessel 14 toward the throat inlet 43 of the vessel 14 and out through the throat inlet 43 into a suitable storage or receiving vessel (not shown).

The carrier flight 41 serves as a retaining medium to improve unloading efficiencies of this apparatus by restricting gravitational flow of product from the path of the spiral elevating flight 40 as the product is carried toward the discharge at the throat inlet 43 by the progressing pitch of the continuous spiral elevating flight 40.

To further improve product unloading efficiencies, the auxiliary counterclockwise wound spiral flighting 47 acts as a booster elevating flight to augment performance of the spiral elevating flight 40. The auxiliary flighting 47 is required to maintain elevating and discharge efficiencies because of the progressively critical increase in spiral pitch of the elevating flight 40 in the throat inlet 43 area smaller diameter of the vessel 14.

The vessel 14 can be unloaded in a matter of minutes when the continuous elevating flight 40 including the right angular carrier flight 41, and the auxiliary spiral flight 47 are used. If the carrier flight 41 and the auxiliary flight 47 are not present, the unloading is extremely prolonged and inefficient.

Provision for versatile application of the blender 10 on products having widely differing characteristics such as viscosity, solids-liquids ratios, density and etc., is provided by use of the variable speed gear motor 24. Product flow and movement can be materially adjusted by speed variations during both the blending and unloading cycle. Further adjustment in operating characteristics is obtainable by adjustment of the angle of elevation of the axis of vessel 14 with respect to level elevation.

The clockwise rotation of the vessel 14 during blending is indicated by the arrow "A" in FIG. 1, and the counterclockwise unloading rotation of the vessel 14 is indicated by the arrow "B" in FIG. 1.

This invention is intended to cover all changes and modifications of the examples of the invention herein chosen for purposes of the disclosure, which do not constitute departures from the spirit and scope of the invention.

What is claimed is:

1. A blender comprising a base, an angularly inclined vessel rotatably mounted on said base, said vessel having a large closed end and a smaller opposed end having an elevated opening, the inner surface of said vessel tapering continuously and uniformly from the large end to the small end, drive means operatively connected to said vessel, said drive means being of variable rotating speed and being reversible, a spiral flight positioned on the inner surface of said vessel, said flight having a lifting flight fastened to said vessel inner surface and projecting toward the center line of said vessel, and a carrying flight connected to said lifting flight and projecting therefrom toward the vessel opening, an auxiliary flight commencing at the vessel opening and spiraling into said vessel along the inner surface thereof at least one revolution, and means for draining said vessel positioned adjacent to the large end thereof.

2. A method of blending without damage, cellular fibrous food products, which are susceptible to crushing, fragmenting, and pulping, and dry ingredients into a homogeneous product including the steps of introducing a quantity of liquid and cellular fibrous food product into an angularly inclined rotatable vessel having fixed spiral flighting positioned adjacent to an inner surface thereof, moving said food product toward the lower end of the inclined vessel, gently reversing the direction of flow of the product during its movement through the vessel, folding portions of the product on the top of the remainder of the product after it reaches the lower end of the vessel, adding a dry solid food product portion to the blended liquid mass, tumbling and folding the dry food product into the liquid mass without damage to the cellular food product, discharging the blended food product through the higher end of the vessel, and recovering a homogeneous food product whose fibrous cellular food ingredient is substantially undamaged.

3. The method defined in claim 2 including the step of lifting and simultaneously carrying the blended food product from the lower end of the vessel to the higher end thereof.

References Cited in the file of this patent

UNITED STATES PATENTS

| | | |
|---|---|---|
| 814,233 | Raps | Mar. 6, 1906 |
| 1,816,990 | Dall | Aug. 4, 1931 |
| 2,338,820 | Peters | Jan. 11, 1944 |
| 3,038,705 | McDermott | June 12, 1962 |
| 3,080,152 | Lendved | Mar. 5, 1963 |